United States Patent
Cagner et al.

(10) Patent No.: US 10,002,376 B2
(45) Date of Patent: Jun. 19, 2018

(54) SYSTEMS AND METHODS OF UNIFORM REMOTE SIZING AND SELLING OF ARTICLES SUCH AS FOOTWEAR AND OTHER APPAREL

(71) Applicant: Future Shoe Inc., Hicksville, NY (US)

(72) Inventors: Evan Cagner, Oyster Bay, NY (US); Sarah Caplan, New York, NY (US)

(73) Assignee: Future Shoe Inc., Hicksville, NY (US)

( * ) Notice: Subject to any disclaimer, the term of this patent is extended or adjusted under 35 U.S.C. 154(b) by 0 days. days.

(21) Appl. No.: 15/468,561

(22) Filed: Mar. 24, 2017

(65) Prior Publication Data
US 2017/0278167 A1    Sep. 28, 2017

Related U.S. Application Data

(60) Provisional application No. 62/328,377, filed on Apr. 27, 2016, provisional application No. 62/313,374, filed on Mar. 25, 2016.

(51) Int. Cl.
*G06Q 30/00* (2012.01)
*G06Q 30/06* (2012.01)
(Continued)

(52) U.S. Cl.
CPC ....... *G06Q 30/0623* (2013.01); *G06F 3/0416* (2013.01); *G06Q 50/01* (2013.01)

(58) Field of Classification Search
CPC .......................................... G06Q 30/06–30/08
(Continued)

(56) References Cited

U.S. PATENT DOCUMENTS 5,128,880 A    7/1992    White
5,164,793 A    11/1992    Wolfersberger
(Continued)

FOREIGN PATENT DOCUMENTS

WO    2014201498    12/2014
WO    2015123518    8/2015

OTHER PUBLICATIONS

VFit http://www.vfitshoes.com/.
(Continued)

*Primary Examiner* — Ethan D Civan
(74) *Attorney, Agent, or Firm* — Kane Kessler, P.C.; Barry E. Negrin

(57) ABSTRACT

A computer-based system and method of universal sizing and selling of apparel is provided. A central computer has a database of universal size indicators for articles of apparel, each corresponding to a range of physical measurements. The central computer receives from at least one remote computer at least one physical measurement corresponding to a consumer and provides to the consumer at least one of the universal size indicators corresponding to the received physical measurement. At least one consumer profile includes the universal size indicators corresponding to the physical measurements of the consumer. The consumer profile is shareable with others. Software is loadable onto the remote computer and is adapted to measure a person's foot placed upon a touch screen of the remote computer. The universal size indicators do not vary amongst different brands of the articles of apparel and include at least one of a character or a shape.

14 Claims, 18 Drawing Sheets

(51) Int. Cl.
*G06Q 50/00* (2012.01)
*G06F 3/041* (2006.01)

(58) Field of Classification Search
USPC .............................................. 705/26.1–27.2
See application file for complete search history.

(56) References Cited

U.S. PATENT DOCUMENTS

| | | | |
|---|---|---|---|
| 5,237,520 A | 8/1993 | White | |
| 5,729,905 A | 3/1998 | Mathiasmeier | |
| 6,029,358 A | 2/2000 | Mathiasmeier | |
| 6,035,283 A | 3/2000 | Rofrano | |
| 6,546,356 B1 | 4/2003 | Genest | |
| 6,549,639 B1 | 4/2003 | Genest | |
| 6,550,149 B2 | 4/2003 | Dowdell | |
| 6,741,728 B1 | 5/2004 | Genest | |
| 6,879,945 B1 | 4/2005 | Cook | |
| 7,076,456 B1 | 7/2006 | Rofrano | |
| 7,089,152 B2 | 8/2006 | Oda | |
| 7,114,260 B2 | 10/2006 | Nguyen | |
| 7,590,562 B2 | 9/2009 | Stoppelman | |
| 7,860,759 B2 | 12/2010 | Stoppelman | |
| 7,909,241 B2 | 3/2011 | Stone | |
| 7,979,322 B2 | 7/2011 | Stoppelman | |
| 8,290,828 B2 | 10/2012 | Stoppelman | |
| 8,433,710 B2 | 4/2013 | Yankovich | |
| 8,517,256 B2 | 8/2013 | Stone | |
| 8,521,616 B2 | 8/2013 | End | |
| 8,523,066 B2 | 9/2013 | Stone | |
| 8,523,067 B2 | 9/2013 | Stone | |
| 8,528,816 B2 | 9/2013 | Stone | |
| 8,606,653 B2 | 12/2013 | Stoppelman | |
| 8,762,388 B2 | 6/2014 | Yankovich | |
| 9,002,874 B2 | 4/2015 | Yankovich | |
| 9,147,209 B2 | 9/2015 | Yankovich | |
| 9,529,921 B2 | 12/2016 | Yankovich | |
| 2002/0023087 A1 | 2/2002 | Vickery et al. | |
| 2004/0168329 A1 | 9/2004 | Ishimaru | |
| 2007/0011173 A1* | 1/2007 | Agostino | A43D 1/02 |
| 2011/0055053 A1 | 3/2011 | Rutschmann | |
| 2011/0106651 A1 | 5/2011 | Stone | |
| 2011/0161194 A1 | 6/2011 | Dumke et al. | |
| 2012/0198949 A1* | 8/2012 | Xia | A43D 1/022 |
| | | | 73/865.8 |
| 2014/0032369 A1 | 1/2014 | End | |
| 2014/0172624 A1 | 6/2014 | Stoppelman | |
| 2014/0300722 A1 | 10/2014 | Garcia | |

OTHER PUBLICATIONS

FeetIt http://feetit.com/ and https://www.facebook.com/FeetItApp.
FootFairy http://sharktanksuccess.blogspot.com/2014/05/foot-fairy-app.html.
Stride Rite RiteFit app http://www.stridente.com/en/mobile-app/ and https://itunes.apple.com/us/app/ritefit/id927025202?mt=8.
Mindskate shoesizr app http://mindskate.com/shoesizr/.
Footmeasure App by Naturino https://itunes.apple.com/us/app/footmeasure/id522002311?mt=8.
Kid Foot Scale Measure App http://apperawlr.com/ios/kid-foot-scale-measure-shoe-siz.
Right Shoes www.rightshoes.ch.
PCT Application No. PCT/US2017/024042, International Search Report and Written Opinion dated Jun. 5, 2017.

* cited by examiner

| UNIVERSAL SIZE | BRAND A STYLE 1 | BRAND B STYLE 1 | BRAND C STYLE 1 | BRAND A STYLE 2 |
|---|---|---|---|---|
| A | YOUTH 5 | YOUTH 6 | YOUTH 6 1/2 | YOUTH 7 |
| B | YOUTH 6 | YOUTH 7 | YOUTH 7 1/2 | YOUTH 8 |
| C | YOUTH 7 | YOUTH 8 | YOUTH 8 1/2 | YOUTH 9 |
| D | YOUTH 8 | YOUTH 9 | YOUTH 9 1/2 | YOUTH 10 |
| E | YOUTH 9 | YOUTH 10 | YOUTH 10 1/2 | YOUTH 11 |
| F | YOUTH 10 | YOUTH 11 | YOUTH 11 1/2 | YOUTH 12 |
| G | YOUTH 11 | YOUTH 12 | YOUTH 12 1/2 | 1 |
| H | YOUTH 12 | 1 | 1 1/2 | 1 1/2 |
| I | YOUTH 13 | 1 1/2 | 2 | 2 |
| J | 1 | 2 | 2 1/2 | 2 1/2 |
| K | 1 1/2 | 2 1/2 | 3 | 3 |
| L | 2 | 3 | 3 1/2 | 3 1/2 |
| M | 2 1/2 | 3 1/2 | 4 | 4 |
| N | 3 | 4 | 4 1/2 | 4 1/2 |
| O | 3 1/2 | 4 1/2 | 5 | 5 |
| P | 4 | 5 | 5 1/2 | 5 1/2 |
| Q | 4 1/2 | 5 1/2 | 6 | 6 |
| R | 5 | 6 | 6 1/2 | 6 1/2 |
| S | 5 1/2 | 6 1/2 | 7 | 7 |
| T | 6 | 7 | 7 1/2 | 7 1/2 |

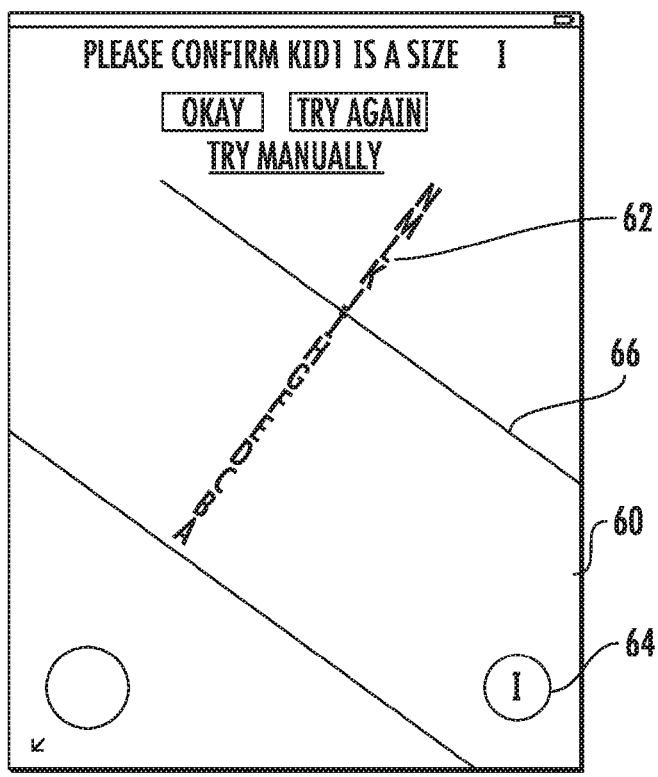

ically the invention is directed to systems and methods of
SYSTEMS AND METHODS OF UNIFORM REMOTE SIZING AND SELLING OF ARTICLES SUCH AS FOOTWEAR AND OTHER APPAREL

RELATED APPLICATIONS

Priority is claimed from a) U.S. Provisional Patent Application No. 62/328,377 filed Apr. 27, 2016 and entitled "SYSTEMS AND METHODS OF UNIFORM REMOTE SIZING AND SELLING OF ARTICLES SUCH AS FOOTWEAR AND OTHER APPAREL" and b) U.S. Provisional Patent Application No. 62/313,374 filed Mar. 25, 2016 and entitled "SYSTEMS AND METHODS OF UNIFORM REMOTE SIZING AND SELLING OF ARTICLES SUCH AS FOOTWEAR AND OTHER APPAREL", the entireties of which are incorporated by reference herein.

BACKGROUND OF THE INVENTION

Field of the Invention

The invention is directed to apparel sizing. More specifically the invention is directed to systems and methods of uniform remote sizing of apparel including but not limited to footwear to improve the experience of shopping online or in-person for such articles as shoes, sneakers, and clothing, especially (but not necessarily) for children.

Description of Related Art

Apparel comes in different sizes. Clothing such as shirts often come in small, medium, large, extra-large, etc. These general-sounding sizes typically vary from brand to brand. Shoes, however, are assigned what seem like very specific numerical sizes, including half-sizes and widths, and including separate numerical ranges for children and adults. In reality, however, the seemingly specific numerical size of a shoe in one brand can be very different in another brand, and can even vary from product to product within a brand. As an example, a size 6 in an X Co. shoe could correspond to a size 7 in a Y Co. shoe, a size 5 in a Z Co. shoe, and even a size 6½ in an X Co. sneaker. As another example, a "youth size 1" in one brand could be 197 mm in length, while the "youth size 1" of another brand could be 212 mm in length, a difference of nearly 10%. It can be difficult to know what size a person is in any type of apparel.

In-store purchases are supposedly easy, in that one can try on a pair of shoes before buying them. However, buying clothing and shoes for children can be problematic. Often, children (especially younger children) have a low tolerance for boring activities such as buying shoes. Physical stores will necessarily have a finite number of brands and sizes from which to choose. Often, the sales representative must shuttle back and forth between the customer(s) and the stock room to retrieve pair after pair after pair. For most adults this is tedious, but for children (and some adults, too), it is intolerable.

As another alternative, people increasingly often buy apparel via the internet without trying on the apparel first. This can save parents and their children the turmoil and potential agony of shoe/clothing shopping in person. However, online shopping is fraught with its own disadvantages. Primarily, by not trying on an article before purchasing it, the purchaser has no accurate concept if something fits properly or not. One might be able to use one's size in a particular brand as a general guide, however as noted above, sizes can vary greatly from brand to brand and among different styles within the same brand. As a result, a significant percentage of online apparel transactions result in a return, which costs the manufacturer part of its profit and significant hassle on the part of the purchaser. Moreover, since children are constantly growing, a pair of shoes or a shirt/jacket purchased even a few months earlier may not be an accurate indicator of what a child's current size is. This is frustrating for parents, but it also makes it difficult for adults further removed from the children than parents (e.g., grandparents, other relatives, band directors or school personnel purchasing uniforms, etc.) to purchase apparel on behalf of children.

Some attempts to address this issue have been made but come up short. In U.S. Pat. No. 6,741,728 to Genest, a complex system of three-dimensional scanning of the customer's foot is provided, and when that scanning data is compared to a database of footwear, a series of footwear options are presented to the customer. This system is quite disadvantageous for several reasons. First, the system requires a 3D scan of the foot, which is difficult to achieve for adults and likely impossible to achieve for children even under the best of circumstances. Moreover, such a 3D scan must be accomplished at a store or some other retail location and cannot feasibly be done by the user herself at home. Second, the system does not provide the key piece of information to the user: what the foot's actual size is. While the Genest system does inform the user what shoes would be a good fit, that keeps the user out of the loop and unable to share the relevant size information with another party (e.g., grandparent, teacher, etc.) or even use the information himself at other retailers.

In US Patent Application Publication No. 2004/0168329 to Ishimaru, again, a complex three-dimensional scan of the foot is made, and a custom-made shoe last is created to the specific dimensions of the scanned data. This system is completely unworkable and cost prohibitive for selling conventional retail footwear. Moreover, it is even less usable for children's footwear, since the child's foot is constantly growing, and a new last would need to be made every 60-90 days.

Accordingly, there is a long-felt need to enable people to shop for apparel such as footwear and anything else that comes in varying sizes online in which people can be reasonably certain in advance that an article will fit properly.

There is also a long-felt need to enable people to determine their size or the size of their children themselves, remotely, so as to facilitate online purchases of clothing.

There is a further long-felt need to enable people to shop for apparel for other people, including and especially other people's children, without having the benefit of the children present.

SUMMARY OF THE INVENTION

The above and other needs are met with the invention, which includes a system and method for universalizing shoe and other apparel sizing for remote purchase. At least one physical measurement is taken for each article. For example, for shoes, the shoe last (the model on which shoes are manufactured) is measured (e.g., at least one of length, width, and ball girth). A brand-agnostic size is determined for that shoe. A series of sizes, e.g., A through Z, may be provided corresponding to different ranges of measurement(s). The purchaser is provided with a sizing chart upon which the desired foot is placed. The chart can be printed on a piece of paper, cardboard, or the like, or it can be part of an app for measuring the foot on a tablet or similar touch-screen, either manually or automatically. The chart will indicate a universal size. When the user desires to purchase an article remotely without trying it on, one variable that is entered into the system is the corresponding universal size. The database of products will automatically match up the articles that correspond to the entered/detected universal size, already knowing that a "G" universal size corresponds to a 6 in an X Co. shoe, as 7 in a Y Co. shoe, a 5 in a Z Co. shoe, and a size 6½ in an X Co. sneaker. This takes the guesswork out of ordering shoes online, and greatly reduces returns to the seller (which cost the seller money). The universal sizing system also enhances the in-person retail experience, in that the customer can go into a store knowing precisely what his size is regardless of brand, not have to try on as many different size permutations, and thereby have a faster and more enjoyable retail experience. The ensuing more efficient retail process is also quite beneficial to the retailer, since more customers can be seen within a given amount of time.

In one embodiment, the invention includes an app for measuring body parts such as feet via a touchscreen of a tablet or similar personal electronic device. The foot is positioned on the device, preferably on the outer physical corner of the device and not just the corner of the screen of the device. The app preferably detects at least one of the brand or model of the device being used to measure. Alternatively and optionally, the user can manually enter the make and model of the device. In either case, border dimension data is provided corresponding to the size of the non-working border of the device. The linear distance the foot occupies on the screen is measured, factoring in the size of the non-working border of the device to achieve a size of the foot being measured. As another alternative, the foot is placed on the corner of the screen, and the linear distance the foot occupies on the screen is measured.

In either case, the user is provided with a universal size of the measured foot. A database of products automatically matches up the footwear items that correspond to the entered universal size. It is also contemplated that brands/manufacturers will adopt the universal sizing system so that, knowing one's universal size, one can purchase the desired articles anywhere, either via the preferred online portal or app, a specific brand's online portal or app, a retail location, or anywhere else such articles are purchasable.

The invention includes a universal apparel sizing system, with each size having a unique designation. In one embodiment, each size is given a letter of the English alphabet, thereby enabling 6 different sizes. Half sizes, and/or other fractional or decimal intervals, may also be provided. In the case of footwear, as an example, the difference between adjacent sizes is preferably between approximately 4 mm and 10 mm, providing more than enough variation for excellent fits of footwear. As an alternative, numbers, colors, symbols, or any other identifying characters or combinations of characters may be employed.

The invention also includes an integrated apparel sizing and commerce platform. Once the user's universal size is determined for given apparel, the platform offers apparel in the properly measured universal size. The platform preferably also offers the user to add additional similar items to the cart, e.g., the next size up (or larger) footwear for children's footwear, other colors, fabrics, and the like. Preferably, the platform includes accounts for each user, and each account preferably has the ability to contain one or more profiles of different intended wearers of the apparel (e.g., a parent can set up an account and have multiple profiles for his multiple children). The platform optionally includes incentivized behavior linked to the user's account. For example, publicly approving the platform on social media can add points or money to the user's account, as can using the integrated measuring app, re-using the measuring app after a predetermined period of time, referring others to the platform, adding additional products recommended by the platform to one's cart (e.g., same product in a larger size), and the like.

The invention includes a computer-based method of universal sizing and selling of apparel. At least one physical measurement is received from at least one remote computer, the at least one physical measurement corresponding to a plurality of articles of apparel. A central computer assigns a universal size indicator from a plurality of universal size indicators to each of the articles of apparel corresponding to the physical measurement. The universal size indicator assigning step preferably includes generating a universal sizing system, wherein each universal size indicator includes at least one of a character or a shape.

The universal size indicators are remotely provided via the at least one remote computer to consumers seeking at least one of the articles of apparel. Each of the universal size indicators preferably correspond to a range of the physical measurements. The articles of apparel are preferably footwear, and the range of physical measurements are preferably approximately 4-10 mm for each of the universal size indicators. Preferably, the universal size indicators do not vary amongst different brands of the articles of apparel.

A database is maintained, preferably on the central computer, of the measurements with respect to corresponding articles. A second physical measurement is received corresponding to a consumer, and one of the universal size indicators is provided to the consumer corresponding to the received second physical measurement. Preferably, the universal size indicators corresponding to the received second physical measurements are stored on the central computer as a consumer profile. Preferably, a consumer profile database is maintained that correlates at least consumer identity with the universal size indicators corresponding to the received physical measurements. Preferably, the consumer can share at least a portion of the consumer profile with others.

Optionally, the articles of apparel comprise footwear, and the receiving a physical measurement step further includes placing a person's foot on a touch screen device and measuring at least the length of the person's foot via the touch screen device. Optionally, the foot is positioned on the corner of the device and not the corner of the screen of the device. Optionally, at least one of the brand or model of the touch screen device being used to measure the foot is read. Optionally, border dimension data is provided corresponding to the size of the non-working border of the device to the central computer. Optionally, the linear distance the foot occupies on the screen is measured, and the size of the non-working border of the device is factored in to achieve a size of the foot being measured.

Optionally, the inventive method includes the steps of measuring a person's foot, determining a corresponding universal size indicator for the measured foot, offering footwear in the corresponding universal size indicator, and offering footwear in a larger universal size indicator than the corresponding universal size indicator.

The aforementioned consumer profile may also include at least one of the following information: second physical measurement history; universal size indicator history; or apparel purchase history.

The inventive method may also encourage the consumer to take the second physical measurement periodically. Optionally, the method may further accumulate a plurality of the second physical measurements for a given consumer and generate a second physical measurement history for the given consumer.

The invention also includes a computer-based system of universal sizing and selling of apparel. A central computer has a database of a plurality of universal size indicators for a plurality of articles of apparel, each of the universal size indicators corresponding to a range of first physical measurements of the articles of apparel. The universal size indicators do not vary amongst different brands of the articles of apparel, and each universal size indicator preferably includes at least one of a character or a shape.

At least one communication link, in communication with the central computer, is adapted to receive from at least one remote computer at least one second physical measurement corresponding to a consumer and adapted to remotely provide to the consumer at least one of the universal size indicators corresponding to the received second physical measurement. Preferably, the articles of apparel include footwear, and the range of first physical measurements is approximately 4-10 mm for each of the universal size indicators. Preferably, at least one consumer profile, corresponding to at least one consumer, is stored on the central computer, the consumer profile including the universal size indicators corresponding to the received second physical measurements from the consumer. A consumer profile database is preferably provided that correlates at least consumer identity with the universal size indicators corresponding to the received second physical measurements. The consumer profile is preferably at least partially shareable with others.

Optionally, the system includes software loadable onto the remote computer, the software adapted to measure a person's foot placed upon a touch screen of the remote computer. Optionally, the software enables a user to position the foot on the corner of the device and not the corner of the screen of the device. Optionally, the software can identify at least one of the brand or model of the touch screen device being used to measure. Optionally, the software can provide border dimension data corresponding to the size of the non-working border around the touch screen to the central computer. Optionally, the software is adapted to: measure the linear distance the foot occupies on the screen, and factor in the size of the non-working border of the device to achieve a size of the foot being measured.

Optionally, the inventive system includes a software module adapted to: determine a corresponding universal size indicator for the measured foot; offer footwear in the corresponding universal size indicator; and offer footwear in a larger universal size indicator than the corresponding universal size indicator. The software module preferably resides on the central computer.

The consumer profile of the inventive system optionally also includes at least one of the following information: second physical measurement history; universal size indicator history; or apparel purchase history.

Optionally, the inventive system encourages the consumer to take the second physical measurement periodically. Optionally, the inventive system also accumulates a plurality of the second physical measurements for a given consumer and generates a second physical measurement history for the given consumer.

BRIEF DESCRIPTION OF THE DRAWINGS

FIG. 1A is a schematic showing the measurement of a shoe last length for creating a universal sizing system in accordance with the invention.

FIG. 5E is a schematic of a sizing screen that has carried out a foot measuring procedure of a footwear sizing and commerce app in accordance with the invention.

FIG. 5F is a schematic of a sizing history screen of a footwear sizing and commerce app in accordance with the invention.

DETAILED DESCRIPTION OF THE INVENTION AND DRAWINGS

Description will now be given with reference to the attached FIGS. 1-10. It should be understood that these figures are exemplary in nature and in no way serve to limit the scope of the invention, which is defined by the claims appearing hereinbelow.

As noted above, because sizes of apparel such as footwear can vary greatly across various brands, the invention includes a brand-agnostic universal sizing system. The articles themselves or something related to the articles must be objectively measured.

In the case of footwear, it is often convenient to measure the footlast or last that is used as the size model in the manufacture of shoes. One or more of several possible measurements of the last may be taken in order to generate the brand-agnostic universal sizing system. As shown in FIG. 1A, one measurement to be taken is the length of last L. A measurement is taken from the toe to the heel of last L along the bottom of last L. This is often the most preferred measurement, especially for children's footwear, since over approximately 90% of children's feet have essentially the same width and girth proportions relative to the length of the foot.

Figure 7A:
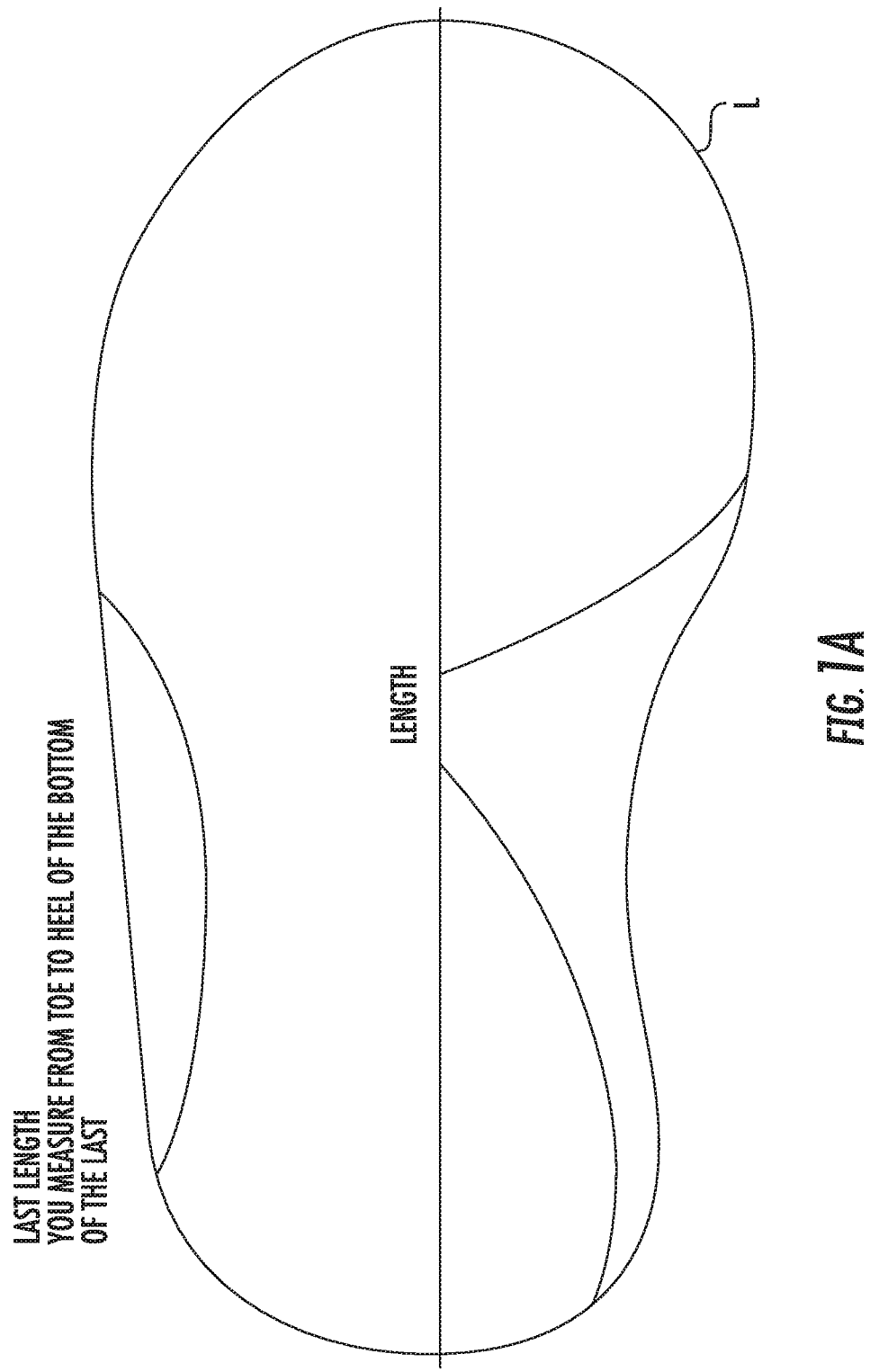
FIG. 7 is a schematic of a method of measuring a foot on a tablet or similar device via a footwear sizing and commerce app in accordance with the invention.
Figure 1B:
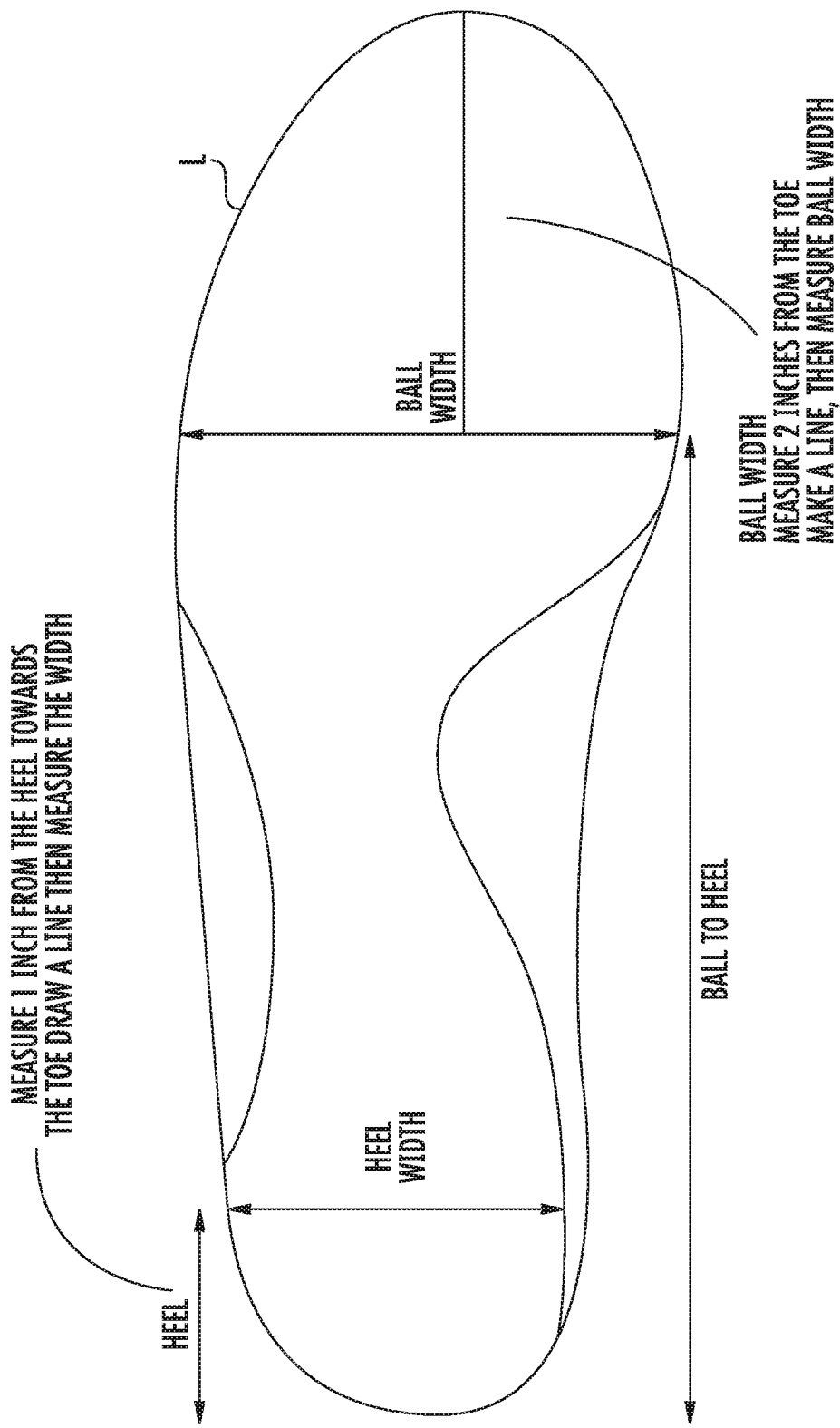
FIG. 1B is a schematic showing the measurement of a shoe last ball width for creating a universal sizing system in accordance with the invention.

Of course, other measurements can be taken as well. For example, as shown in FIG. 1B, the width of the ball and/or heel of last L can also be measured. To ensure consistency across measurements by different manufacturers, specific steps are preferably taken. For example, as shown in FIG. 1B, the width of the heel is measured consistently at a point 1 inch from the rearwardmost point of last L. Similarly, the width of the ball is measured consistently at a point 2 inches from the forwardmost point of last L. It is contemplated that other longitudinal locations may be utilized instead of 1 inch from the rear and 2 inches from the front.

Figure 1C:
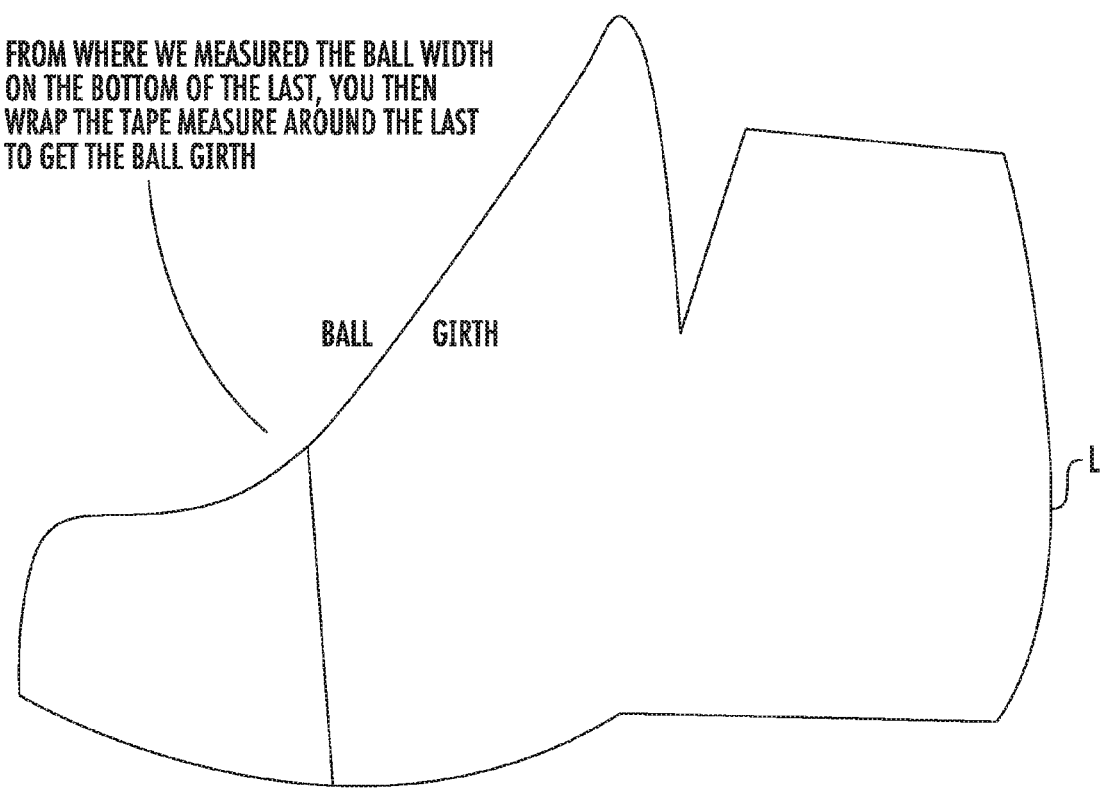
FIG. 1C is a schematic showing the measurement of a shoe last ball girth for creating a universal sizing system in accordance with the invention.

Another possible measurement that can be taken of last L is shown in FIG. 1C. Here, the girth of the ball of last L is determined. To ensure consistency, the same longitudinal location that was used to determine ball width is used to determine ball girth.

When multiple lasts of multiple styles and/or brands have been measured, the measurements are tabulated into a database, and a universal sizing system is generated. Such a system is shown in schematic fashion in FIG. 2. Here, Brand A Style 1 runs a bit smaller in its sizing than Brand B Style 1, which also runs a bit smaller than Brand C Style 1, which also runs a bit smaller than Brand A Style 2. A consumer has traditionally had difficulty determining the proper size of her foot or her child's foot for this and other reasons. Now, a universal sizing system is applicable across all participating brands, so that a given size precisely corresponds to a specific measurement, regardless of the arbitrary sizing applied by the brand. For example, Brand A Style 1 size Youth 5, Brand B Style 1 size Youth 6, Brand C Style 1 size Youth 6½, and Brand A Style 2 size Youth 7 could all be 138 mm in length. As such, these are assigned a universal size.

Figure 2:
FIG. 2 is a table showing the relative sizes of exemplary articles of clothing such as footwear correlated into a universal sizing system in accordance with the invention.

As shown in FIG. 2, one embodiment of the universal sizing system utilizes the English alphabet, generating up to 26 unique universal sizes. Each letter size is preferably 4-10 mm apart from its adjacent next letter size, leaving enough gradation amongst sizes to cover the spectrum of the overwhelming majority of footwear while providing an exceptionally accurate fit for the wearer. Half sizes (e.g., A, A-½, B, B-½, etc.), and/or other fractional or decimal intervals between whole sizes, may also be provided.

As an alternative to the English alphabet, numbers, colors, symbols, or any other identifying characters or combinations of characters may be employed. Not everyone can read English or similar Romance languages that use a similar alphabet. As such, an alternate sizing system may be provided based on numbers, since most cultures do use Hindu-Arabic numbers. In addition or in the alternative, a series of shapes can be used to convey size.

Figure 4:
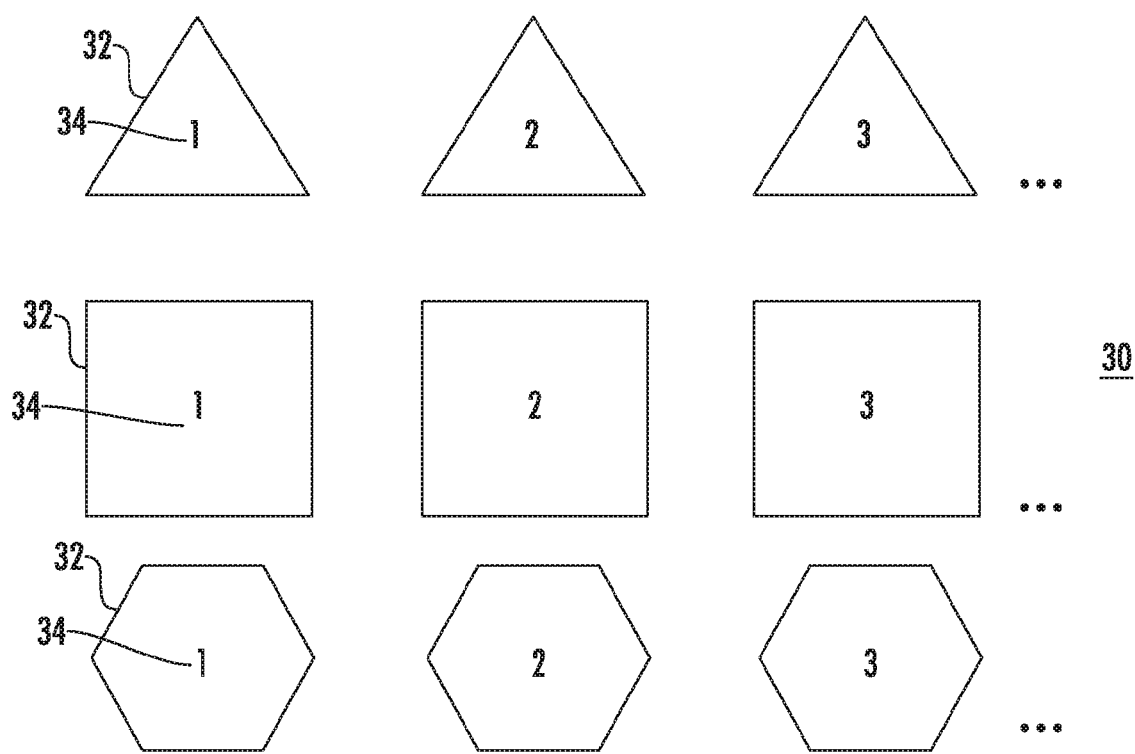
FIG. 4 is a schematic showing one possible universal sizing system in accordance with the invention.

As one non-limiting example, FIG. 4 shows an alternative sizing system 30 that utilizes a combination of geometric element 32 and numeric element 34. In this example, the smallest series of sizes are depicted with triangles associated with increasing numbers 1-9, followed in size by squares with increasing numbers 1-9, followed by hexagons with increasing numbers 1-9. In this optional sizing convention, the greater the number of sides of the geometric shape, the bigger the scale of the size range. When the system is universally adopted by brands, retailers, etc., a consumer can simply request their size by geometric element 32 and numeric element 34 (e.g., "Triangle-5"). Even the least literate consumers and young children themselves can be active participants in purchasing decisions, and the system is functional in any country or region. This system provides 27 unique universal sizes. Adding zero increases the number to 30 unique universal sizes. Adding additional geometric shapes can increase the number accordingly. Of course, for some types of apparel (e.g., hats), fewer universal sizes may be required.

In addition or in the alternative, different colors could be employed along with any of the above universal sizing conventions. It is contemplated that, since it may not readily be obvious which colors would be "larger" than others, a color guide can be provided along with the size. Other variations are contemplated.

Figure 3:
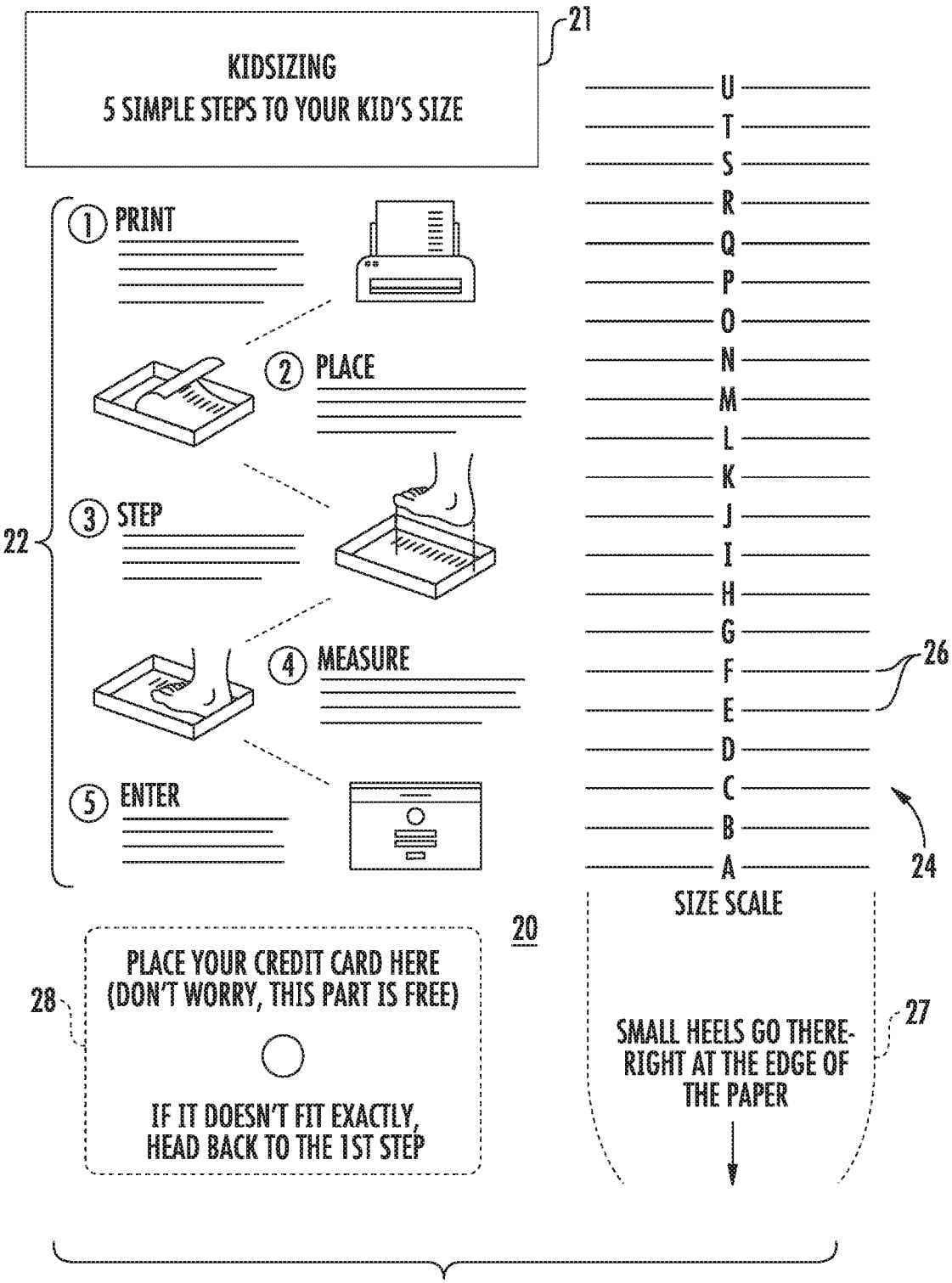
FIG. 3 is a schematic showing an exemplary sizing chart to be used by the consumer in accordance with the invention.

In any event, now that the various styles and brands of footwear are universally sized in accordance with the above, the consumer must determine what size her foot is or the size of her child's foot. FIG. 3 is a schematic showing an exemplary sizing chart 20 to be used by the consumer at home. A logo 21 may be provided, either of the retailer, the manufacturer, a third party, or the like. Use instructions 22 (discussed below) are provided to ensure proper and accurate measurements are taken. A size scale 24 is provided having a series of gradations 26 corresponding to the various sizes in the system. Adjacent to size scale 24 is a heel locator 27 to ensure proper placement of the heel of the foot with respect to scale 24. Additionally, since it is contemplated that sizing chart 20 is to be printed at home, scale verifier 28 is provided on chart 20 to enable the user to ensure that chart 20 was printed on the proper scale. If the consumer prints the chart at the incorrect scale, all of the size measurements will likewise be incorrect. As such, scale verifier 28 is sized to conform to the dimensions of a universally sized object. In the embodiment shown in FIG. 3, scale verifier 28 is dimensioned to conform to the size of a typical credit card, all of which must necessarily be the same exact size. A credit card is an excellent scale verifier, because it is not very large and thus does not occupy a significant amount of space on chart 20, yet it is generally the same size all over the world. Other reference objects could be used, such as a physical token (not shown) provided separately from the chart, or a piece of US currency, or the like. Other variations are contemplated.

As indicated in instructions 22 on chart 20, first the customer prints chart 20 at 100% scale. The proper scale is verified by placing a credit card atop scale verifier 28. If the credit card matches the dimensions of scale verifier 28, the measurement process may continue. Next, the printout of chart 20 is placed on a flat horizontal surface and preferably against a fixed vertical surface to ensure it does not move during measurement and to ensure proper placement of the person's foot. As one example, the printout can be placed in the lid of a shoe box, a board game box, or the like. As another example, the printout can be placed on the floor with the bottom edge abutting a wall. As yet another example, the scale could come pre-printed inside a shoe box for future orders. In any event, next, the foot to be measured is placed atop scale 24 against the wall or box lid wall so that the heel of the foot is placed within heel locator 27. The furthest that the foot extends on scale 24 is the size of that foot. For some people, this will be the big toe, for others this will be the second toe. In either or any other case, the procedure is repeated for the other foot, and whichever foot is larger determines the person's universal size. The size is recorded, and now the customer has a significant data point with which to purchase footwear from any brand participating in the universal sizing system.

The universal size can be requested in any retail setting, e.g., either in-store, online, or anywhere else. Additionally, the universal size can be shared with other people who are interested in purchasing apparel for the sized person. As one example, a parent can measure the universal size of a child's feet and provide that size to the child's grandparent. As another example, a child's universal size can be provided to a band director or other school functionary attempting to purchase uniforms for multiple children. In these and other cases, the purchaser does not need to have the intended wearer's foot/body available to be able to purchase footwear/apparel on behalf of the wearer. The intended wearer can be a child or an adult, of course.

Figure 5A:
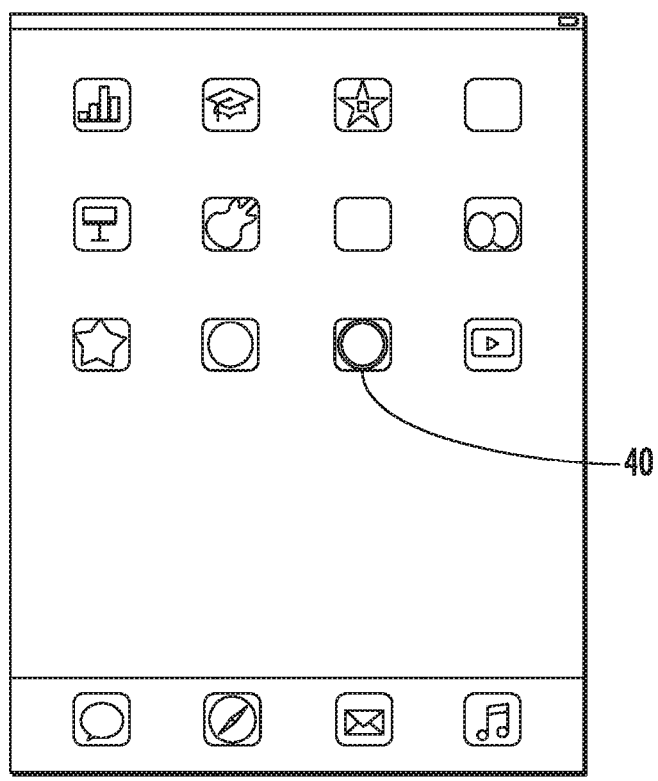
FIG. 5A is a schematic of a tablet home screen showing a software application ("app") icon for a footwear sizing and commerce app in accordance with the invention.
Figure 5B:
FIG. 5B is a schematic of a login page for a footwear sizing and commerce app in accordance with the invention.
Figure 5C:
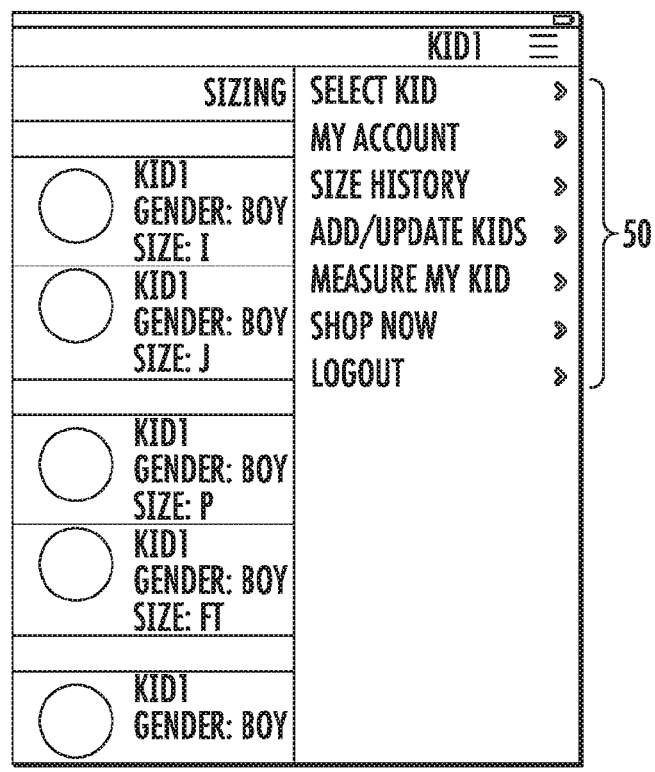
FIG. 5C is a schematic of a main menu of a footwear sizing and commerce app in accordance with the invention.

The invention also includes apparel sizing and commerce software to streamline the purchase of same into a unified online experience. Exemplary screenshots of an app for such software appear in FIGS. 5A-F. FIG. 5A depicts the home page of a typical tablet. Icon 40 is indicative of a footwear sizing and commerce app that can be utilized by the user. Upon activating icon 40, the user is taken to the login screen depicted in FIG. 5B. As with many software applications, the user may sign into an existing account or create a new account. Upon doing so, the user is taken to a main menu 50 as depicted in the screen shot of FIG. 5C. Main menu 50 includes such options as selecting one of a number of different profiles ("select kid"), a review of one's account ("my account"), the ability to view the sizing history of the user/child ("size history"), the ability to modify one's account by adding or updating profiles ("add/update kids"), enabling the measurement of a body part such as a foot ("measure my kid"), a commerce function ("shop now"), and the like. Other functionalities are also contemplated as falling within the scope of the invention.

Figure 5D:
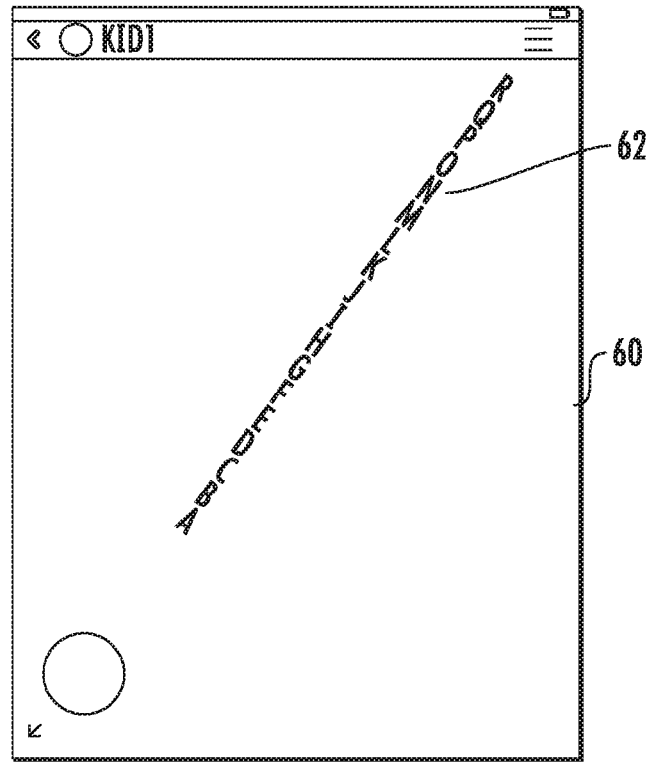
FIG. 5D is a schematic of a sizing screen of a footwear sizing and commerce app in accordance with the invention.

Should the user not know the size of the foot for which footwear is desired, the inventive software application includes a measuring function. One example of the measuring function is shown in FIG. 5D as measuring screen 60. Since most tablets have touchscreens, the placement of a body part such as a foot on the screen of the tablet is a convenient way to measure a foot. As shown in FIG. 5D, measuring screen 60 includes scale 62. It is preferred that scale 62 be provided at an angle to the screen, e.g., substantially along the diagonal of opposite corners of the screen. In this way, the longest possible measurement can be taken. However, the invention contemplates incorporating any orientation of the scale (horizontal, vertical, angle, adjustable angle, other).

Figure 7:
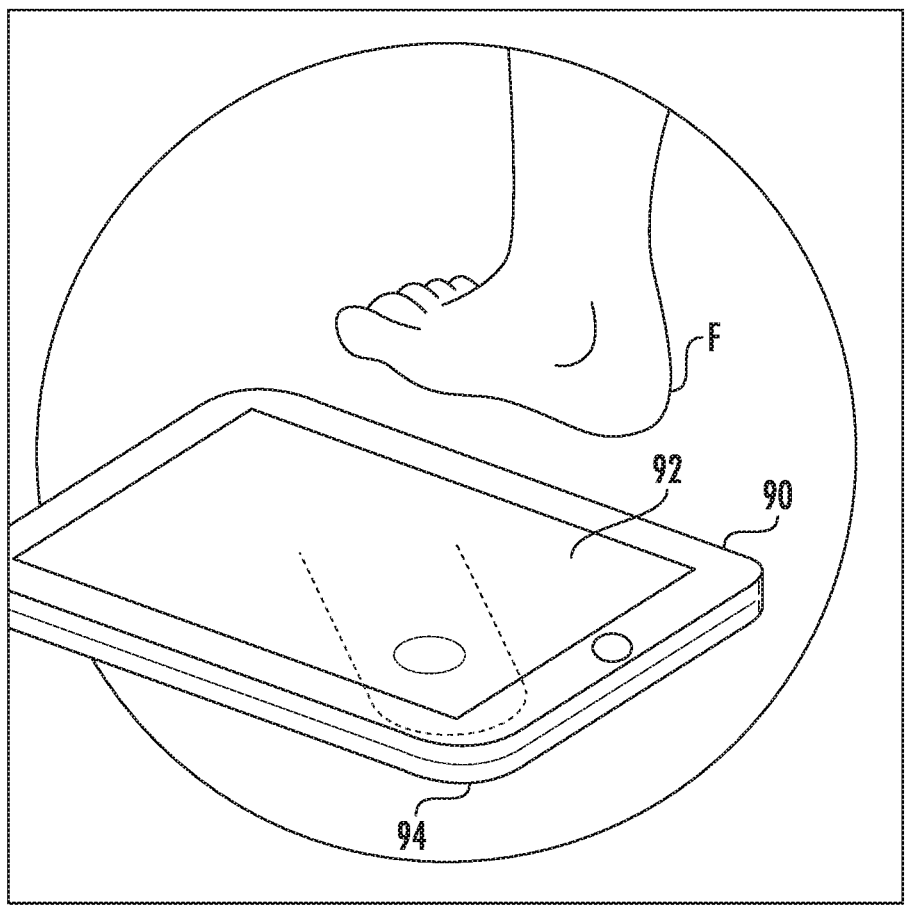

Additionally, as shown in FIG. 7, it is preferred to measure foot F by placing it on the outermost physical corner 94 of tablet 90, not simply on the corner of screen 92 of tablet 90. This creates several advantages. First, an even greater length of foot can be measured. Second, this reduces the likelihood of damage to the screen of the tablet, since the pressure of the heel of the foot will be placed on the metal or plastic of the border of tablet 90 rather than the more fragile glass of screen 92. Third, by providing a concrete physical location for the foot to be placed, accuracy and repeatability in measuring is made much more likely. In one embodiment, the app automatically detects at least one of the brand or model of the device being used to measure and provides border dimension data corresponding to the size of the non-working border of the device (since different devices have different dimensions of borders). In another embodiment, the user will manually enter the brand and/or model of the device being used. In both cases, the linear distance the foot occupies on the screen is measured, factoring in the size of the non-working border of the device to achieve a total size of the foot being measured.

Touchscreens on tablets and similar devices rely on creating a capacitance field on their surfaces and detecting a change in the capacitance when that field is distorted. The human body is conductive, so when a person touches a touchscreen, the capacitance field of the touchscreen becomes distorted. The screen detects that distortion. Thus, the size of a foot placed on the touchscreen of a tablet or similar device can be computed and a measurement can be made.

FIG. 5E shows the results of one such exemplary measurement. The person's foot extended between size I and J on scale 62, as indicated by the darkened portion 66 of screen 60. In one embodiment, because the measurement was closer to size I, size I is chosen. In another embodiment, the larger size is always chosen. In either case, the size may be indicated in two ways: first, by size indicator 64, and second graphically by the extent of the darkened portion 66 along scale 62. This size can be recorded manually by the user and/or used by the app automatically (e.g., products requested will default to the measured size) to generate a seamless online footwear shopping experience.

Optionally, size indicator 64 can increment upwards through the various scale sizes (e.g., A, B, C, D, . . . ) while the measurement is being taken to give a visual indication to the user that the measuring process is actually occurring. Additionally, in the case of the preferred universal sizing scale employing an alphabet, it reinforces the alphabet in a child whose foot is being measured, making it both somewhat fun and somewhat educational at the same time. Various audio and/or video components may also be included to enhance the experience.

FIG. 5F shows a sizing history screen in accordance with the invention. Because children's feet are constantly growing, their caregiver must purchase new footwear on a regular basis as they outgrow their old footwear, regardless of whether the old footwear is worn out. The inventive system encourages periodic remeasuring of children's feet by, for example, sending a reminder to the caregiver every predetermined period of time (e.g., 60 days, 90 days, etc.). That period of time may be preset by the system or adjusted by the user. Optionally, the system may provide compliance incentives to the caregivers, e.g., providing a discount for each measurement after a certain time period (e.g., 60-90 days) and/or before another certain time period (e.g., 6-12 months).

Figure 6A:
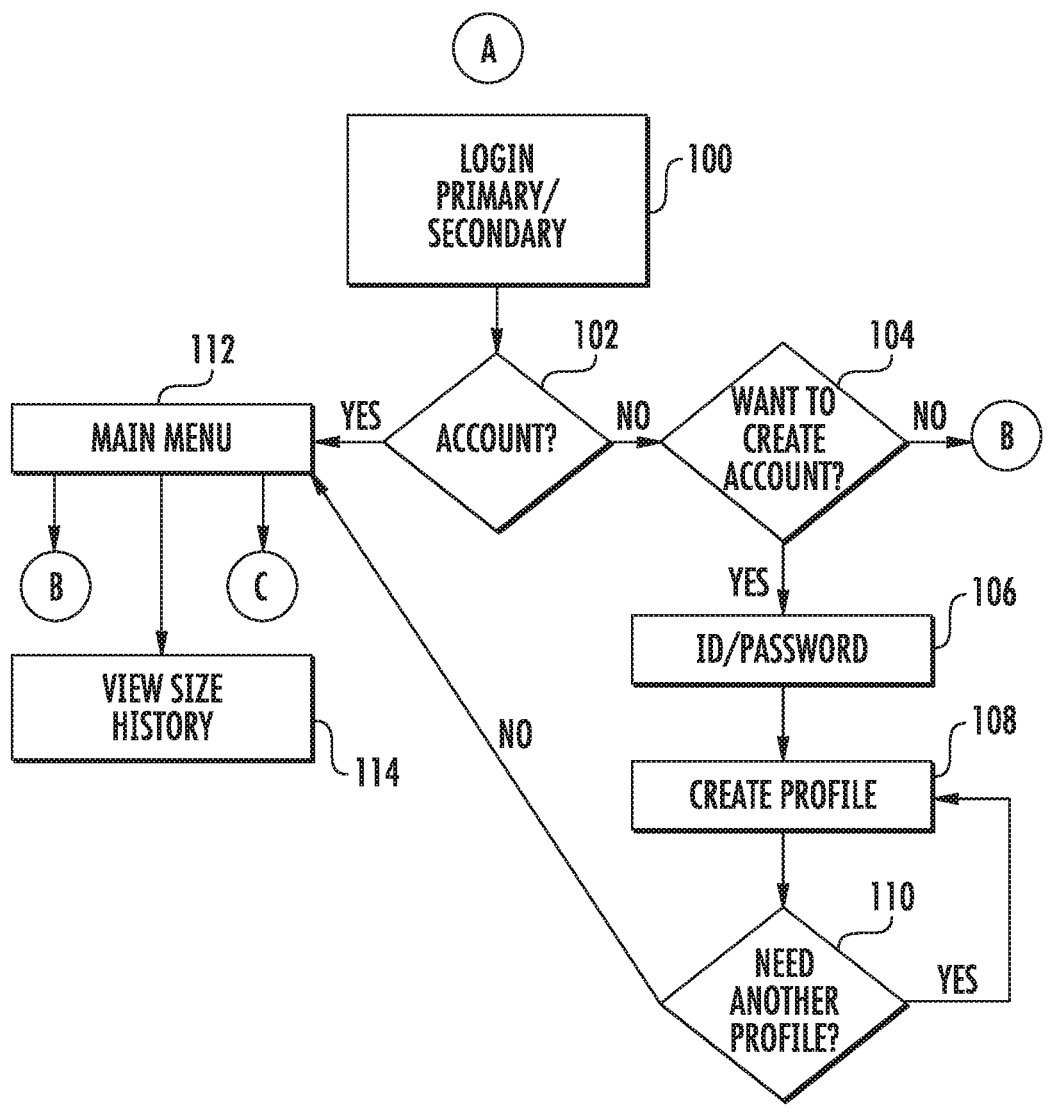
FIG. 6A is a flow chart of a main logic flow of a footwear sizing and commerce app in accordance with the invention.
Figure 6B:
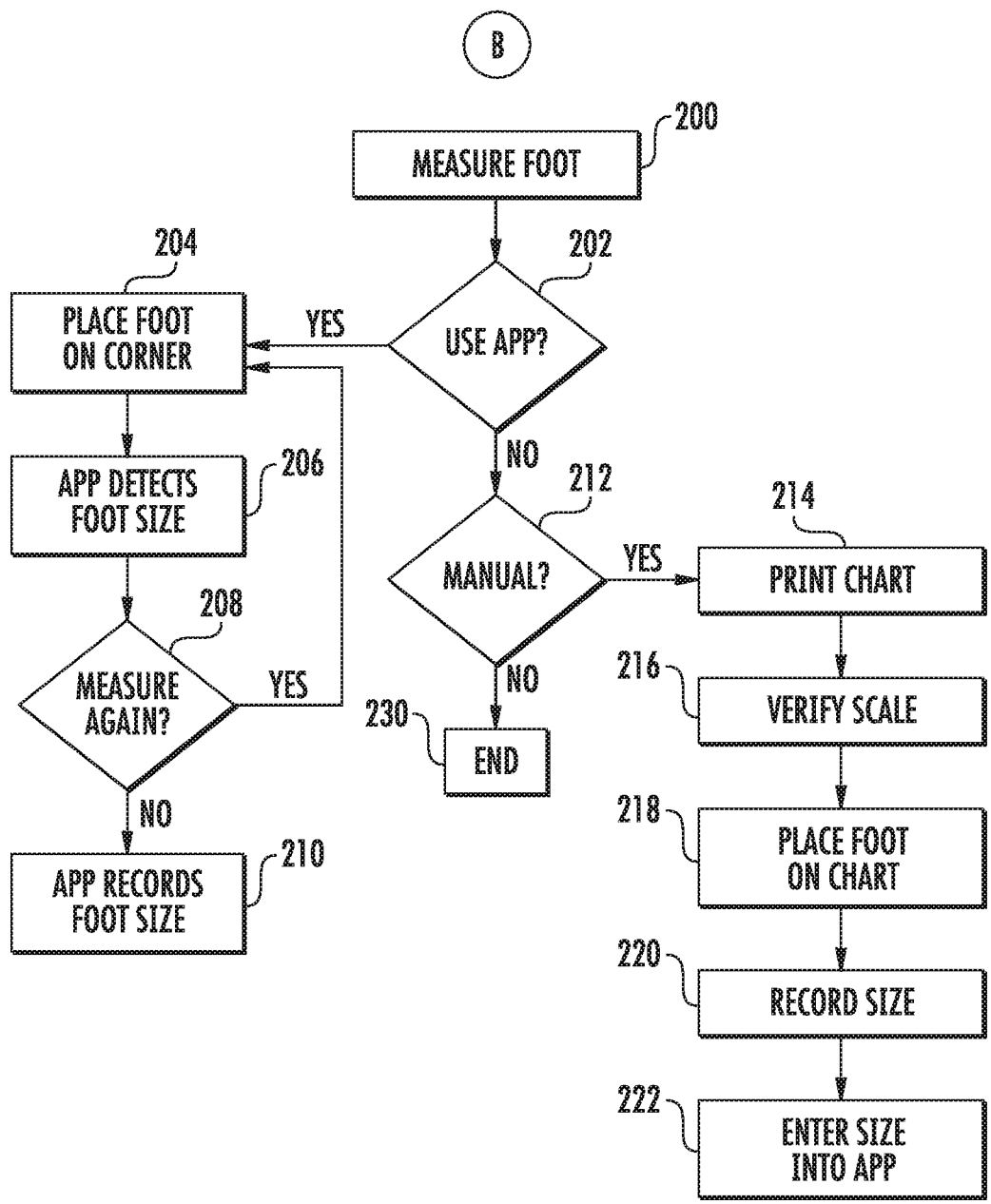
FIG. 6B is a flow chart of a foot measuring logic flow of a footwear sizing and commerce app in accordance with the invention.
Figure 6C:
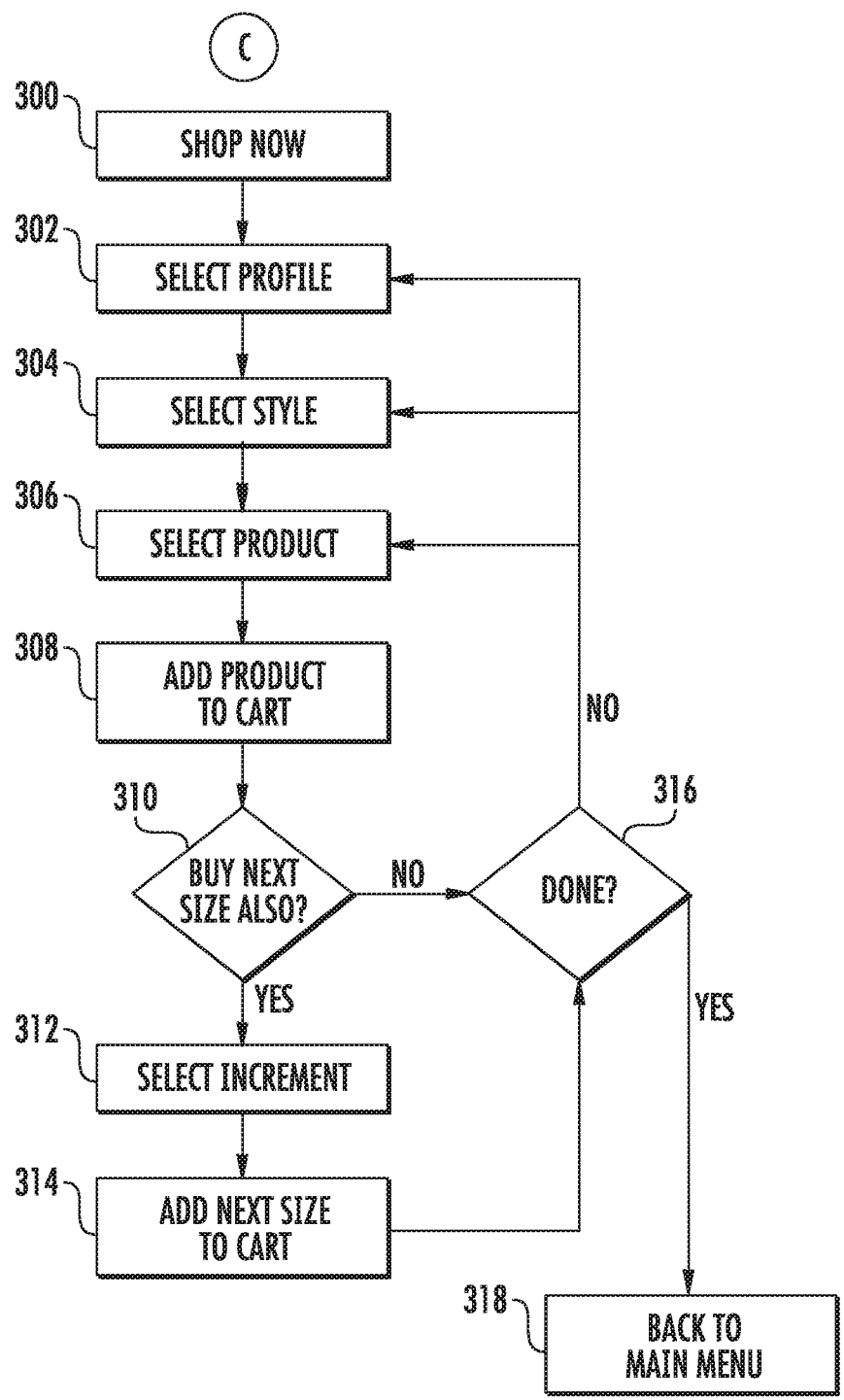
FIG. 6C is a flow chart of a commerce logic flow of a footwear sizing and commerce app in accordance with the invention.

In operation, the inventive system works at least as shown in the flow diagrams of FIGS. 6A-C. FIG. 6A is the initial starting point for the app, at which the user is invited to login at step 100. A given account may be provided with a primary user (e.g., a parent) who has complete administrative control over the account (e.g., full edit rights, ability to measure, and any and all other actions), and it may be provided with one or more secondary users (e.g., grandparents) who are able to access the account and buy footwear for the intended wearer but not edit or modify the account in any way. Different IDs and/or passwords may be provided to differentiate multiple levels of users associated with the same account.

In any event, the software asks the user if they have an existing account at step 102. If the answer is no, the user is given the option to create an account at step 104. If they do not want to create an account, the logic flows to a different area, for example, to the measuring function of FIG. 6B. If the user does wish to create an account, an ID/password combination s requested and entered at step 106, and a profile is created at step 108. Since many people have more than one child, the software inquires if the user wishes to create another profile within the same account at step 110. If another profile is desired, then it is created back at another iteration of step 108. If not, or if the user already has an existing account, the software goes to the main menu at step 112 and as shown in exemplary form in FIG. 5C. From the main menu, the user can measure a foot as described and shown in FIG. 6B, view the size history at step 114, or shop for footwear as described and shown in FIG. 6C.

The foot measuring functionality of the system is shown in FIG. 6B. First, the user selects the measure foot function from the main menu at step 200. The software inquires if the user wants to measure via the app at step 202. If the user selects the app, then measuring screen 60 is displayed, and the user places the to-be-measured foot on the corner of the device at step 204. The app detects the size of the foot at step 206. The user is given the option to measure the foot again at step 208, and if that is desired, the logic flows back to step 204. If a remeasurement is not desired, the app records the measured foot size at step 210. Alternatively, the user can measure the foot manually using scale 62 of measuring screen 60 of the app shown in FIG. 5D without employing the automatic touchscreen detection of the profile of the foot (i.e., visually noting how far the foot extends on scale 62 when the foot is atop the tablet).

If the user chose not to measure the foot via the app at step 202, the software inquires if the user wishes to measure the foot manually at step 212. If so, a copy of sizing chart 20 is sent to the user, e.g., via e-mail, for printing, and the chart is printed at step 214. The user verifies that she printed sizing chart 20 at the proper scale at step 216. Once the size chart scale is verified, the to-be-measured foot is placed on the chart at step 218. The size is recorded at step 220, and the size may be entered into the app at step 222. The user is now ready to commence use of the commerce functionality of the software to its fullest potential. (In one embodiment, the user can skip the measuring process entirely and proceed directly to the commerce functionality. However, the universal sizing feature of the invention greatly enhances the experience while significantly reducing the chance of erroneous sizing and the concomitant hassle of returning ill-fitting apparel.)

Commerce functionality is shown schematically in FIG. 6C. First, the user selects the "shop now" option from the main menu at step 300. If the user is logged into her account, and if there is more than one profile associated with the account, the desired profile is selected at step 302. Optionally, the user can select a general style of footwear (e.g., dress shoe, sneaker, sandal, flip flop, etc.) at step 304 and/or a specific brand or product at step 306. The product is added to an online shopping cart in a manner well known in the retail arts.

At this point, the system may prompt the user to purchase the same exact footwear just purchased at the "next size up" at step 310. This is a feature that is provided because, in many cases, when a child has outgrown a pair of footwear that the child or the caregiver really enjoy, the next size or style is no longer available anymore when it is time to buy the next pair. A discount on the next size up pair (e.g., $10) may be provided to incentivize the customer to add a second pair of the same shoe in a larger size for when their child's foot has grown. If the customer agrees to purchase the "next size up", optionally, the software will ask the customer how much bigger they want the next pair to be (e.g., one size larger, two sizes larger, etc.) at step 312. Alternatively, the software will not ask the customer this question and will instead proceed to add the second pair at the immediately larger size up to the user's cart at step 314. In addition or in the alternative, the app may ask the customer if other variations besides "next size up" are desired, e.g., same article in a different color, same article in different fabric (e.g., stretch versus non-stretch), and the like.

The app will ask if the customer is finished shopping at step 316. If not, the logic can flow back to any of steps 302, 304, or 306 (select profile, select style, or select product, respectively). If the customer is finished shopping at step 316, he is directed back to the main menu at step 318.

The user's account may include a banking-style component, storing either actual currency or points to be used for rebates, or the like. The platform optionally includes incentivized behavior linked to the user's account to entice the user to use the platform more extensively in return for bonuses such as currency, points, etc. For example, publicly approving the platform on social media can add points or money to the user's account. Additionally, since it is greatly desired to have the user use the universal sizing system, using the integrated measuring app function can add points or money to the user's account. Moreover, since children's feet are constantly growing, re-using the measuring app after a predetermined period of time and/or signing up for reminders to re-measure one's children's feet periodically can be rewarded. Other incentivized behavior can include referring others to the platform, buying a certain amount of merchandise in one session and/or in one predetermined time period, and the like.

The invention is not limited to the above description. For example, although the above disclosure is primarily concerned with footwear, the invention is also applicable to other articles of clothing. As an example, for pants, the actual inseam and/or waist of the pants are measured as opposed to the reported size by the brand manufacturer. This takes the guesswork out of purchasing articles that might come in arbitrary sizes such as women's sizes (even numbers from 0 upward, and/or petite versus tall, etc.), or small/medium/large, or the like. An exemplary at-home sizing system may include a tape measure-style reference guide. Another exemplary at-home sizing system may include an app that takes a photograph of the person holding or standing next to a reference object having a given size. This will enable the app to calculate the user's various body dimensions (pants length, waist, etc.) relative to the known fixed size of the reference object. Other variations are contemplated.

Also, the above description focuses primarily on tablet-type devices, however, any computing-type device may be employed, including but not limited to laptops, notebooks, tablets, phablets, smartphones, handheld personal electronic devices, wearable personable electronic devices, and the like as discussed below.

There are other, alternative, ways of measuring a child's foot and using that measurement in the system of the present invention. This invention includes all such ways of measuring.

One alternative method is to compare the length of the foot to the length of a reference object of a known size. One such reference object can be a dollar bill (or other bill of US paper currency). Such bills are all the same size, and they are of a known size. For a longer foot, multiple bills (or multiple smaller reference objects) can be lined up to make a reference object that is long enough to measure the foot.

Figure 9:
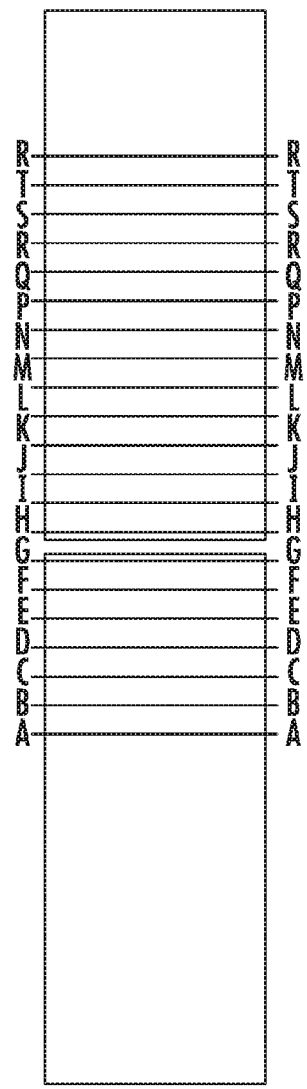
FIG. 9 is a schematic showing use of a commonplace article such as a dollar bill being used to aid in measuring a person's foot in accordance with the invention.

An example is shown on FIG. 9 attached. As shown therein, the user takes two crisp, flat $1 bills and lays them vertically on the floor so that George Washington is face up. The bills should then be aligned vertically with no gap between them. Then, the user should use the wall as a starting point to place the bills against the wall, and then the child's heel against the wall, on the bills. The user must take note of where the longest toe (usually the big toe or second toe), lands. Both feet should be measured, and whichever size is larger is the correct size. The user should mark on the bills or on paper under/next to the bills the furthest extent of the feet, and that mark should be compared with a visual guide provided to the user to find the corresponding universal size of the feet. Finally, the user can log into the central database and enter the corresponding universal size measurement into the profile. Alternatively, the user can take the measured universal size to a retailer with brands that subscribe to the universal sizing system.

In addition, other indicia on the currency can be used as measuring points. For example, the letters of the phrase "The United States Of America" (for example, a credit card or a ruler).

In any such case, with the length of the foot being known in comparison to the length of a standard reference object, the system can calculate the proper shoe size based on the A to Z sizing system and/or simply a straight length measurement (e.g., in mm).

In addition, the user might take a photograph of the foot when the foot is placed next to a reference object of known size. The photo can be uploaded to the app, where the app recognizes the reference object, determines its size, and converts the photo into a measurement for one of the abovementioned universal sizing systems and/or simply a straight length measurement (e.g., in mm).

Other reference objects that can be used are a credit card or a ruler, for example.

Figure 10A:
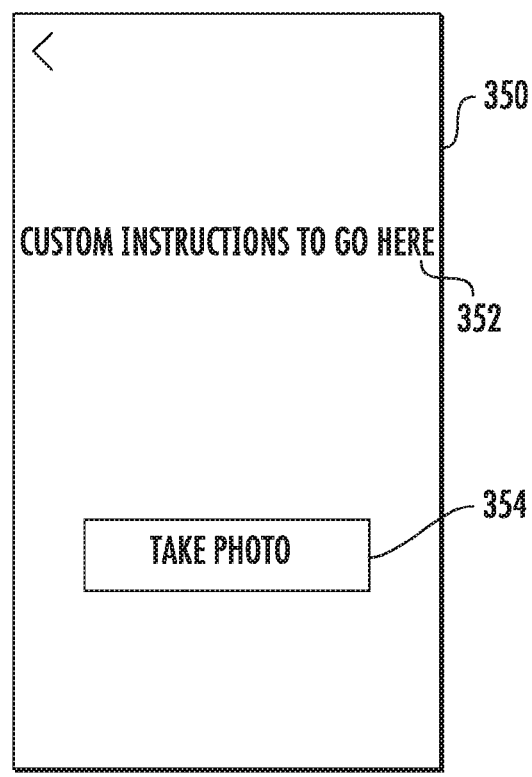
FIG. 10A is a schematic of an electronic device screen showing an exemplary page of a foot measuring function in accordance with the invention.
Figure 10B:
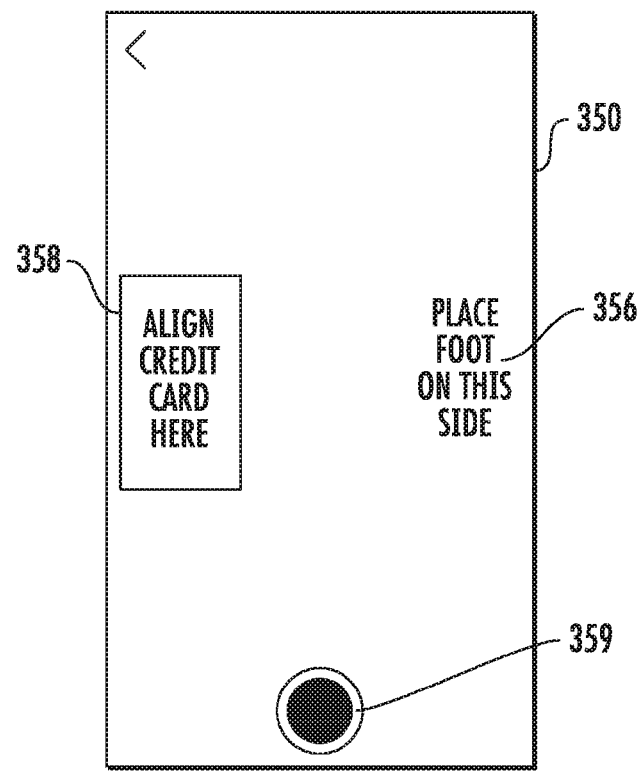
FIG. 10B is a schematic of an electronic device screen showing another exemplary page of a foot measuring function in accordance with the invention.
Figure 10C:
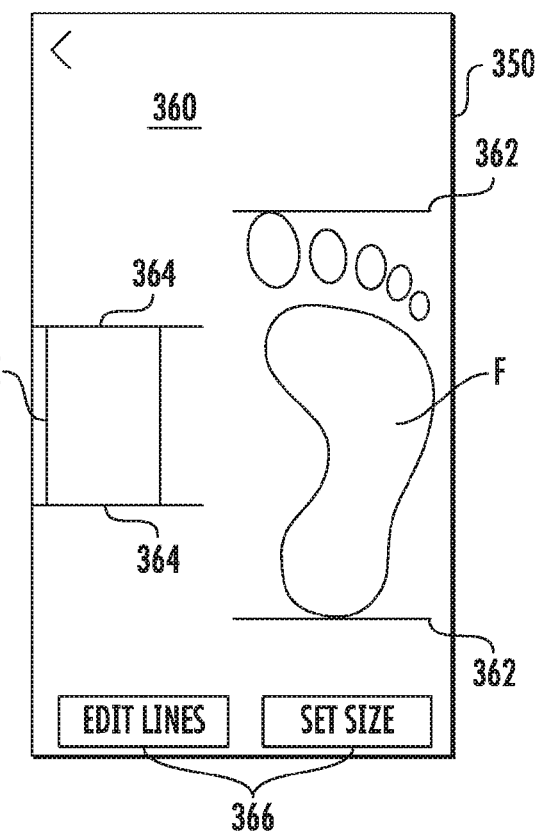
FIG. 10C is a schematic of an electronic device screen showing yet another exemplary page of a foot measuring function in accordance with the invention.
Figure 10D:
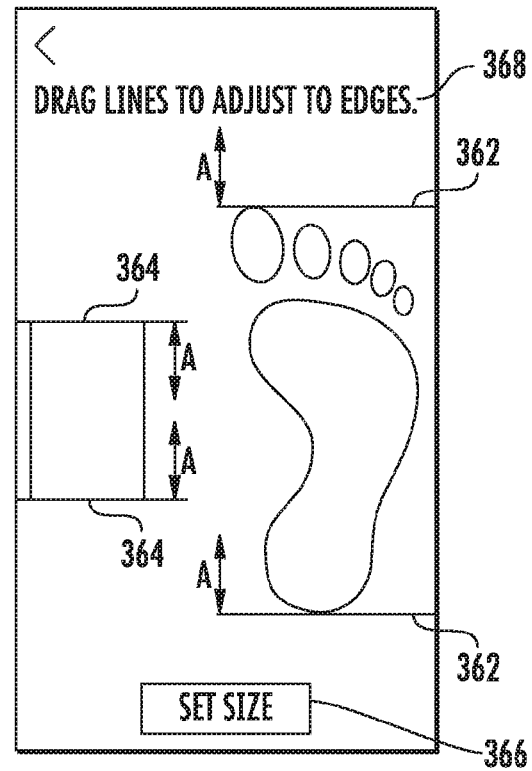
FIG. 10D is a schematic of an electronic device screen showing still another exemplary page of a foot measuring function in accordance with the invention.
Figure 10E:
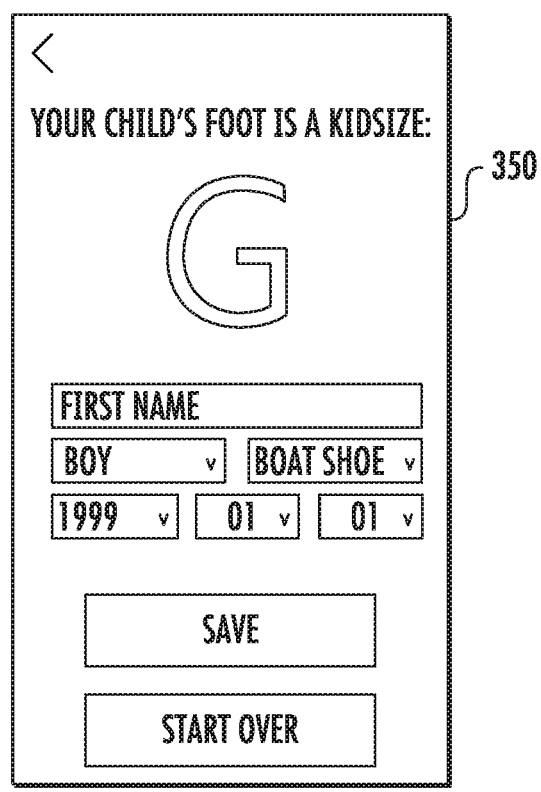
FIG. 10E is a schematic of an electronic device screen showing an exemplary final page of a foot measuring function in accordance with the invention.

Another foot measuring embodiment is depicted in FIGS. 10A-E. In overview, the user takes a photograph of, or otherwise detects, the foot next to a standard-sized item such as a credit card. In FIG. 10A, tablet 350 (or similar device) is provided with instructions to the user and a "take photo" button 354. When the "take photo" button is pressed or otherwise activated, the screen shifts to what appears in FIG. 10B: a camera-type setting and a template overlay indicating a location 356 where one should place one's foot in the frame of the camera and another location 358 where one should place one's reference marker (e.g., credit card) in the frame of the camera. A photo snap button 359 is provided to acquire the image (i.e., take the photograph). The system then analyzes the taken image to determine where the foot begins and ends and where the standard-sized item begins and ends. As shown in FIG. 10C, the system provides demarcation lines 362 indicating where the foot F begins and ends and demarcation lines 364 indicating where the credit card CC begins and ends in image 360. The user is prompted either to move the lines to align with the actual ends of the foot/card or accept the estimated positions of the demarcation lines with buttons 366. As shown in FIG. 10D, the user has selected the "edit lines" button 366 because they desired the demarcation lines 362 and/or 364 to be in a different location than the software placed them (e.g., the user wanted a larger fit, the software did not entirely accurately align with the ends of the foot F or card CC, or the like). As shown in FIG. 10D, the user is instructed at instructions 368 to drag the demarcation lines to adjust them to the proper position with respect to the ends of the foot/card. The user would move lines 362 and/or 364 in the direction of arrows A. Once the position of the lines is fixed, the user presses/activates the "set size" button 366. The system determines the size of the foot based on the relative respective distances between the foot demarcation lines 362 and the card demarcation lines 364. Since the size of card CC will always be the same, the distance between demarcation lines 364 should always represent the same length regardless of its actual length in the image/photo. The distance between the foot demaracation lines 362 can be calculated to determine the size of the foot. The size is provided to the user as shown in FIG. 10E, along with the opportunity to generate an account and save the data.

In addition or in the alternative, FIG. 10B can represent the user placing a foot and a card directly atop the device and having the device detect both the foot and the card and provide an estimate of demarcation line positioning as described above.

Another alternative is to provide a paper sizing chart as mentioned above, but with lines marked off in inches or millimeters and centimeters rather than with the actual A to Z (or other universal) measurement. The user can read the measurement and enter it into the app. The measurement can be used in that form, or can be converted into the A to Z (or other universal) sizing system, and/or other scales.

Another alternative is to measure the length of the foot directly with a ruler. The user can read the measurement and enter it into the app. The measurement can be used in that form, or can be converted into the A to Z (or other universal) sizing system. This method also is usable when no tablet or special chart is available to the user.

Figure 8:
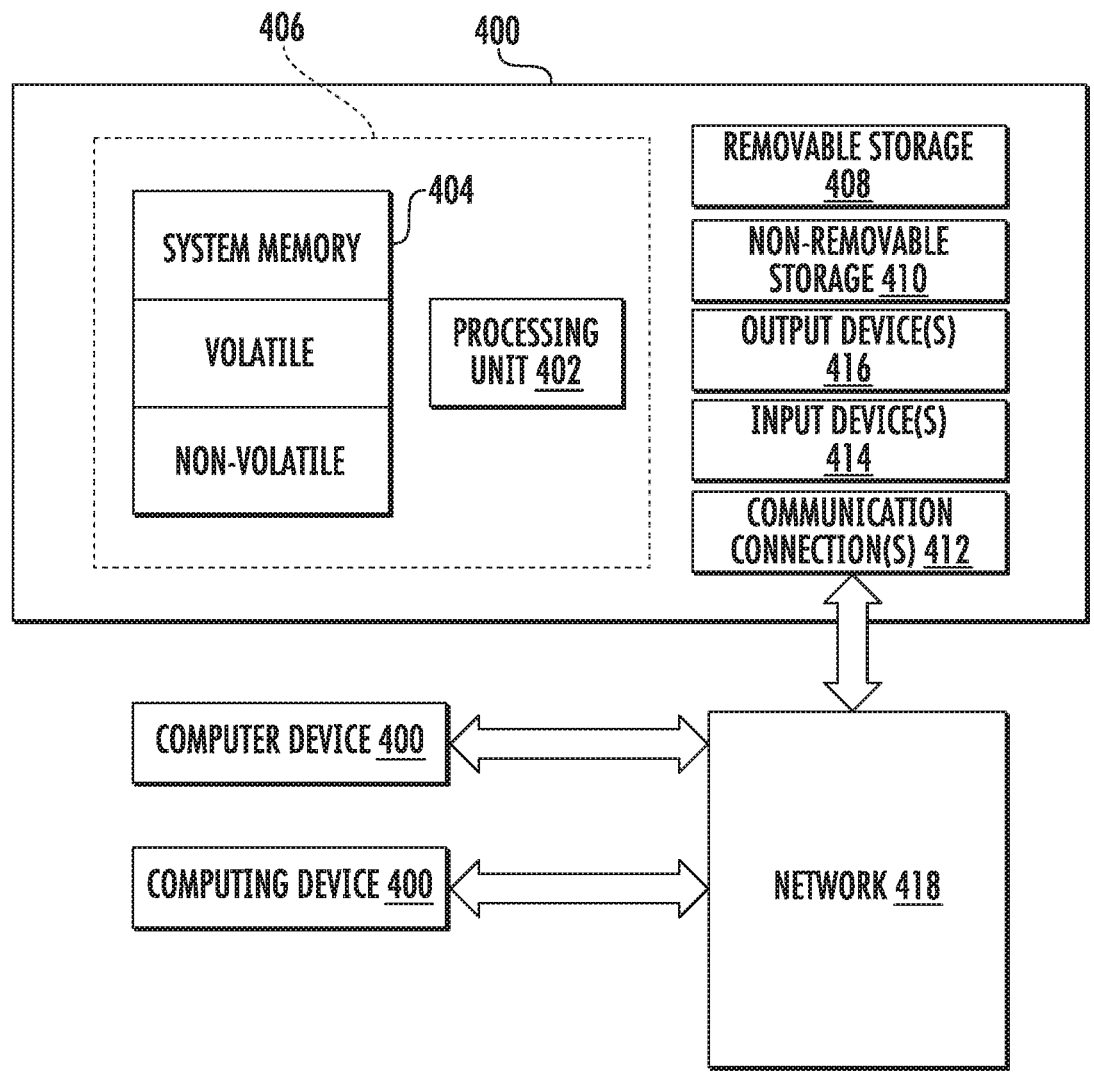
FIG. 8 is a block diagram of an exemplary computing environment within which various embodiments of the invention may be implemented.

FIG. 8 depicts an exemplary computing environment in which various embodiments of the invention may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal electronic devices such as smart phones and smart watches, tablet computers, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 400. In its most basic configuration, computing device 100 typically includes at least one processing unit 402 and memory 404. Depending on the exact configuration and type of computing device, memory 404 may be volatile (such as random access memory (RAM)), non-volatile (such as read-only memory (ROM), flash memory, etc.), or some combination of the two. This most basic configuration is illustrated in FIG. 8 by dashed line 406. Computing device 400 may have additional features/functionality. For example, computing device 400 may include additional storage (removable and/or non-removable) including, but not limited to, magnetic or optical disks or tape. Such additional storage is illustrated in FIG. 8 by removable storage 408 and non-removable storage 410.

Computing device 400 typically includes or is provided with a variety of computer-readable media. Computer-readable media can be any available media that can be accessed by computing device 400 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 404, removable storage 408, and non-removable storage 410 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 400. Any such computer storage media may be part of computing device 400.

Computing device 400 may also contain communications connection(s) 412 that allow the device to communicate with other devices. Each such communications connection 412 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. The term computer-readable media as used herein includes both storage media and communication media.

Computing device 400 may also have input device(s) 414 such as keyboard, mouse, pen, voice input device, touch input device, etc. Output device(s) 416 such as a display, speakers, printer, etc. may also be included. All these devices are generally known and therefore need not be discussed in any detail herein except as provided.

Computing device 400 may be one of a plurality of computing devices 400 inter-connected by a network 418, as is shown in FIG. 8. As may be appreciated, the network 418 may be any appropriate network; each computing device 400 may be connected thereto by way of a connection 412 in any appropriate manner, and each computing device 400 may communicate with one or more of the other computing devices 400 in the network 418 in any appropriate manner. For example, the network 418 may be a wired or wireless network within an organization or home or the like, and may include a direct or indirect coupling to an external network such as the internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as USB flash drives, SD cards, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 418 or a distributed computing environment. Still further, aspects of the presently disclosed subject matter may be implemented in or across a plurality of processing chips or devices, and storage may similarly be effectuated across a plurality of devices in a network 418. Such devices might include personal computers, network servers, and handheld devices, for example.

In addition, a number of methods are described above. The invention also includes a computer readable medium provided with executable instructions to carry out those methods.

Having described certain embodiments of the invention, it should be understood that the invention is not limited to the above description or the attached exemplary drawings. Rather, the scope of the invention includes any equivalents as would be appreciated by one of ordinary skill in the art.

What is claimed is:

1. A computer-based method of universal sizing and selling of apparel, comprising the steps of:
   receiving at a central computer from at least one remote computer at least one first physical measurement of at least one of i) a plurality of articles of apparel or ii) at least one form around which said articles of apparel are molded;

assigning from the central computer a universal size indicator from a plurality of universal size indicators to each of said articles of apparel corresponding to said first physical measurement;

remotely providing said universal size indicators from the central computer to consumers seeking at least one of said articles of apparel to the consumers' respective remote consumer computing devices, wherein said universal size indicators do not vary amongst different brands of said articles of apparel, and wherein each universal size indicator includes at least one of a character or a shape.

2. A computer-based method of universal sizing and selling of apparel according to claim 1, each of said universal size indicators corresponding to a range of said first physical measurements.

3. A computer-based method of universal sizing and selling of apparel according to claim 2, said articles of apparel comprising footwear, said form comprising a shoe last, and said range of said first physical measurements being 4-10 mm for each of said universal size indicators.

4. A computer-based method of universal sizing and selling of apparel according to claim 1, further comprising the step of maintaining a database on said central computer of said first physical measurements with respect to corresponding said articles.

5. A computer-based method of universal sizing and selling of apparel according to claim 1, further comprising the steps of:

receiving a second physical measurement of a consumer from a remote consumer computing device; and providing one of said universal size indicators to the remote consumer computing device corresponding to the received second physical measurement.

6. A computer-based method of universal sizing and selling of apparel according to claim 5, further comprising the step of storing on said central computer said universal size indicators provided respectively to the consumers as respective consumer profiles.

7. A computer-based method of universal sizing and selling of apparel according to claim 6, further comprising the step of maintaining a consumer profile database that correlates at least consumer identity with said universal size indicators provided to the consumers.

8. A computer-based method of universal sizing and selling of apparel according to claim 7, further comprising the step of enabling the consumer to selectively share access to at least a portion of said consumer profile with other individuals.

9. A computer-based method of universal sizing and selling of apparel according to claim 5, wherein said articles of apparel comprise footwear, said receiving a second physical measurement step further comprising the steps of:

placing a person's foot on a touch screen of the remote consumer computing device; and measuring at least the length of the person's foot via the touch screen.

10. A computer-based method of universal sizing and selling of apparel according to claim 9, said placing step further comprising the step of positioning a heel of the foot on a non-touch-sensitive corner of the remote consumer computing device and not a corner of the touch screen of the remote consumer computing device.

11. A computer-based method of universal sizing and selling of apparel according to claim 9, further comprising the step of providing border dimension data corresponding to the size of a non-touch-sensitive border of the remote consumer computing device to the central computer, and said measuring step further comprising the steps of:

measuring the linear distance the foot occupies on the screen; and factoring in the size of the non-touch-sensitive border of the remote consumer computing device to achieve a size of the foot being measured.

12. A computer-based method of universal sizing and selling of apparel according to claim 9, further comprising the steps of:

measuring a person's foot;

determining a corresponding universal size indicator for the measured foot;

offering footwear in the corresponding universal size indicator; and offering footwear in a larger universal size indicator than the corresponding universal size indicator.

13. A computer-based method of universal sizing and selling of apparel according to claim 7, wherein said consumer profile also includes at least one of the following information: second physical measurement history; universal size indicator history; or apparel purchase history.

14. A computer-based method of universal sizing and selling of apparel according to claim 5, further comprising the steps of:

encouraging each consumer to take and submit the second physical measurement periodically;

accumulating a plurality of the second physical measurements for each consumer over time; and generating a second physical measurement history for each consumer.

* * * * *